May 1, 1928. 1,668,079
C. G. IRWIN
TRAILER
Filed Feb. 1, 1927 2 Sheets-Sheet 1

Inventor:
Charles G. Irwin
by J. J. Geisler
Atty

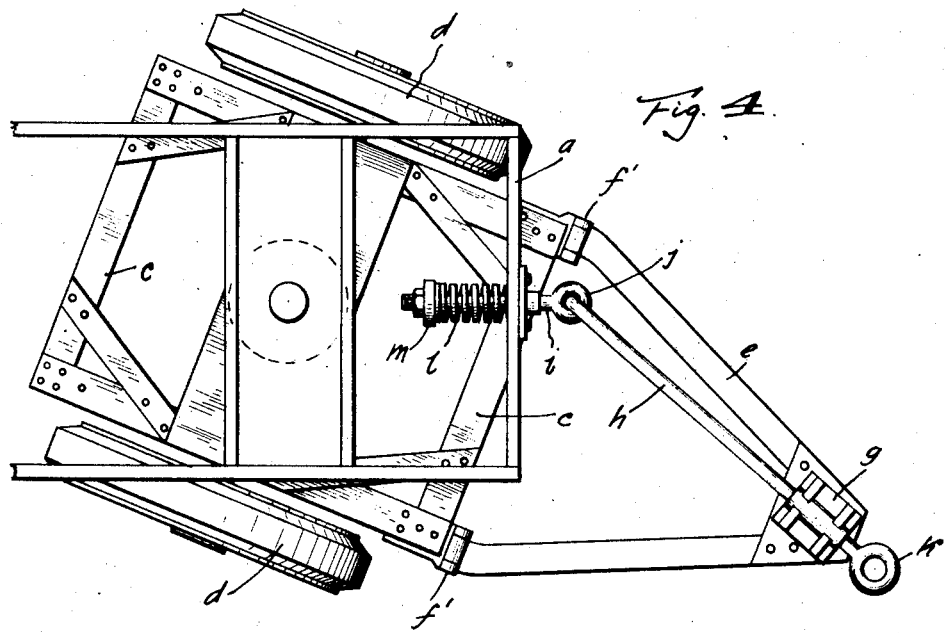
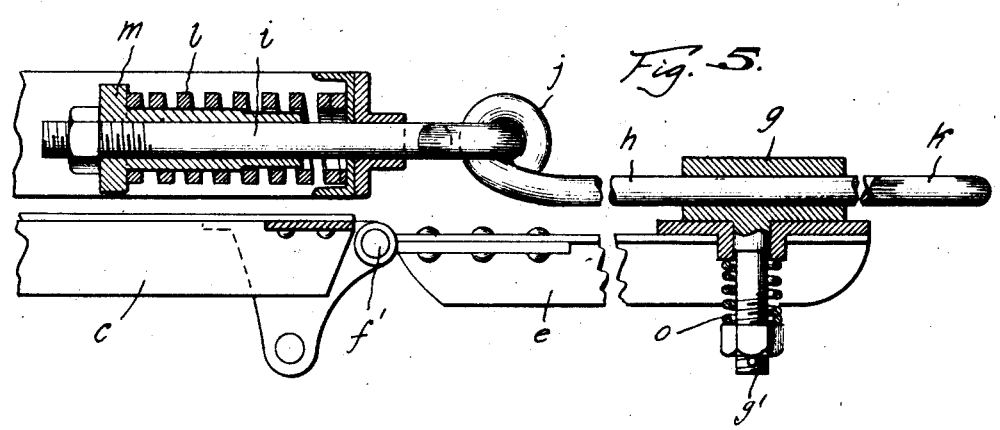
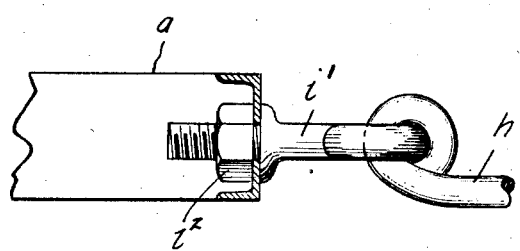

Patented May 1, 1928.

1,668,079

UNITED STATES PATENT OFFICE.

CHARLES G. IRWIN, OF PORTLAND, OREGON.

TRAILER.

Application filed February 1, 1927. Serial No. 165,129.

My invention relates to trailers of motor trucks and especially to means for coupling the trailer to its leader.

All the motor truck trailers in present use, that have come to my knowledge, have the common disadvantage of not properly following in the track of its leader. That is, when making a turn, the trailer has a tendency to continue straight ahead until brought around to the direction of the leader with a jerk, which often swings it too far in the opposite direction, so that it is brought back by another jerk, and this turning process consists of a number of vigorous jerks or a "whipping action" which results in subjecting the draw bar and coupling, and in fact the frame of both leader and trailer to sudden and undue strains, with the consequent rapid wear on the various parts, requiring frequent costly repairs and replacements, which are also expensive in lost time while the equipment is out of service.

This same whipping action develops more or less even during a straight pull, and especially if the road is rough, in which case if either the leader or the trailer strikes a deep rut, the sudden strain resulting is so severe as to be liable to break the couplings or some related part, and the leader and its train may be stranded on the road with attendant delay and annoyance.

My invention deals especially with four wheeled trailers, but may be equally successfully applied to any other type of trailer.

The principal object of my invention is to provide a coupling means for attaching a trailer to its leader which will eliminate the said swaying and jerking of the trailer as it follows along a straight road; and at the same time so to adapt my coupling that the wheels of a trailer will follow in the path of the wheels of the leader while turning, without excessive wear and resistance to the draw bar.

A still further object is to provide a coupling simple in construction, economical of manufacture, and adapted to meet all the conditions of the road.

These objects and the details of construction will hereinafter be explained and described with reference to the accompanying drawings.

I attain my objects in a vehicle trailer, in combination with the vehicle frame and the steering wheel platform, the said platform provided with an A-frame extension, and a pivoted guide-block carried by the front end of said extension. I provide a spring restrained coupling member carried by the front end of the said platform and a draw-bar having its inner end connected to said coupling member, and its front end slidably bearing in said pivoted guide-block.

In the drawings:

Fig. 4 shows a plan view similar to Fig. 3 except the front wheels are shown turned at an angle to the frame of the trailer and the changed position of the draw bar with relation to the A frame, which is connected to the front wheels;

Fig. 5 shows the details of construction of the means for attaching the draw bar to the trailer frame, and to the apex of the A frame; and Fig. 6 shows another method of affixing the draw bar to the frame of the trailer.

The frame $a$ of the four wheeled trailer is rigidly mounted on springs over the rear wheels $b$ and is mounted over the front wheels for limited horizontal rotation on a platform $c$ which is rigidly mounted on springs over the front wheels $d$.

Figure 1:
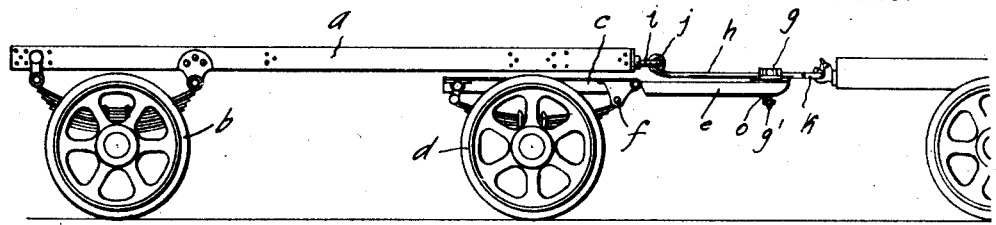
Fig. 1 shows a side elevation of a four-wheeled trailer coupled to its leader.
Figure 2:
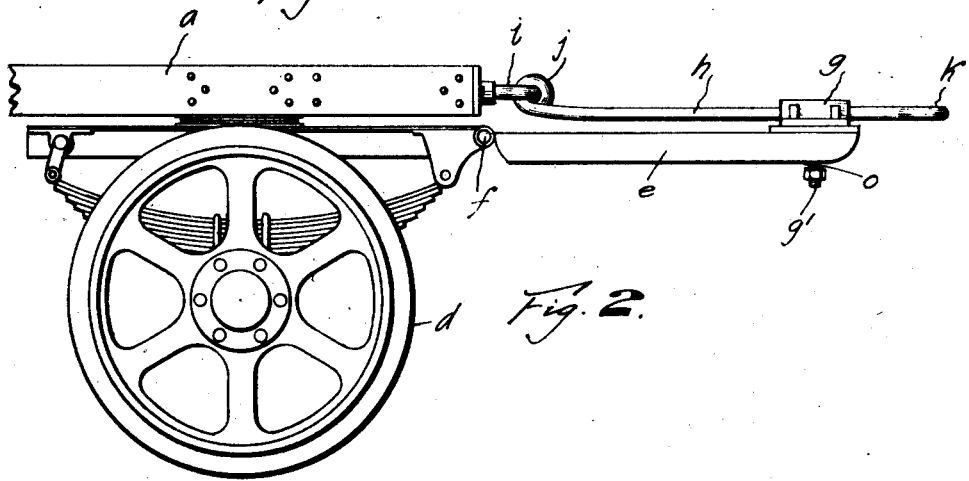
Fig. 2 shows a larger scaled side elevation of the forward part of a trailer and the details of my coupling.

An A frame $e$ is hinged for vertical movement to the platform $c$ as at $f$ and $f'$, and is provided at its apex with a guide $g$ through which a draw bar $h$ slides freely. The draw bar $h$ is provided at each end with eyes $j$ and $k$ and the eye $j$ is loosely attached to an eye bolt $i$ which extends through the front transverse portion of the frame $a$, and is provided with a heavy compression coil spring $l$ which bears against the inside of the frame $a$ and a washer $m$, which is held in place on the end of the eye bolt by a suitable nut. The eye $k$ on the draw bar is fastened by any suitable means to the leader as shown in Fig. 1.

The guide $g$ is pivotally secured to the apex of the A frame by a bolt $g'$ over which a spring $o$ is mounted, thus providing limited flexibility to vertical strain.

Figure 3:
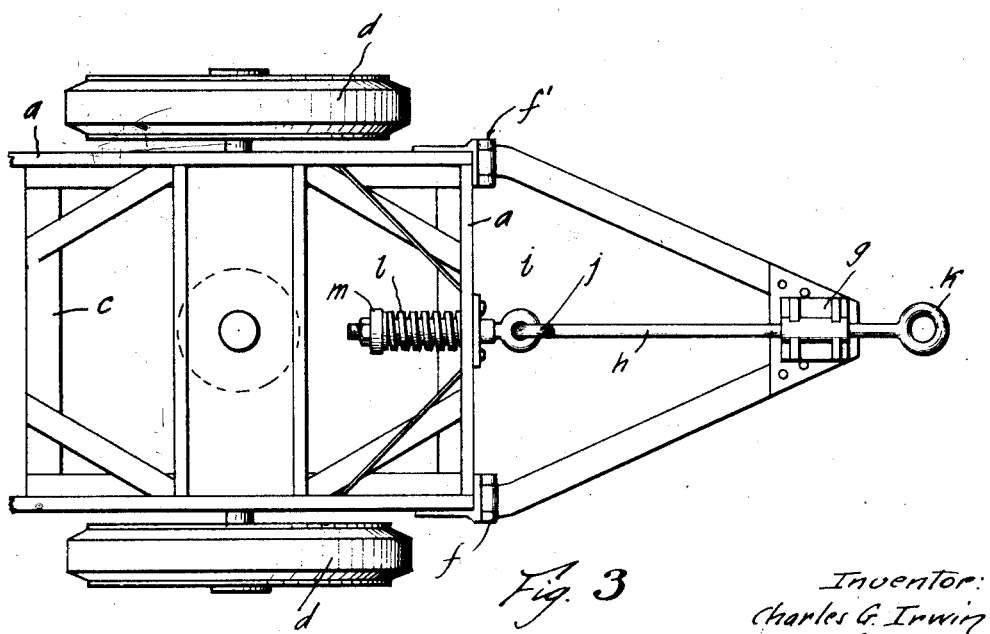
Fig. 3 shows a top plan view of the forward portion of a trailer and further details of the coupling.

Referring now to Fig. 3, the relative position of the front wheels and the frame of the trailer is shown during a straight pull, when the pulling force is coincident with the plane of the draw bar, and Fig. 4 shows the relative position when the trailer is following its leader on a turn, and the draw bar $h$ by means of its free movement in the guide $g$ has changed the direction of the front wheels, but at the same time held them against free lateral movement while the drawing force is still transmitted to the frame $a$ through the said draw bar.

The hinged portion of the A frame as at $f$ and $f'$ and the eye $j$ in the draw bar provide sufficient flexibility to absorb all minor shocks, and the coil spring $l$ provides sufficient resiliency to absorb sudden jerks transmitted from the leader.

Thus I have provided a coupling between a trailer and its leader which will accommodate itself to any changes in direction of the leader or those smaller changes due to the roughness of the road, and at the same time by means of the A frame connected to the platform $c$ and the draw bar in which it is journaled prevents free lateral movements or whipping either on a turn or during a straight pull.

Under certain conditions the spring $l$ provided on the eye bolt $i$ is not necessary and as shown in Fig. 6 an eye bolt $i'$ may then be fixed rigidly to the frame $a$ of the trailer by a nut $i^2$ but otherwise my device will be the same and will function in exactly the same manner.

I claim:

1. In a vehicle trailer, in combination with the vehicle frame and the steering wheel platform, the said platform provided with an A-frame extension, a pivoted guide-block carried by the front end of said extension and a draw-bar having its inner end connected to the front end of the vehicle frame and its front end slidably bearing in said pivoted guide-block.

2. In a vehicle trailer, in combination with the vehicle frame and the steering wheel platform, the latter provided with an extension, a spring seated pivoted guide-block carried by the front end of said extension and a draw-bar having its inner end connected to the front end of the vehicle frame and its front end slidably bearing in said pivoted guide-block.

3. In a vehicle trailer, in combination with the vehicle frame and the steering wheel platform, the latter provided with an extension, a spring seated pivoted guide-block carried by the front end of said extension, a spring restrained coupling member carried by the front end of the said platform and a draw-bar having its inner end connected to said coupling member, and its front end slidably bearing in said pivoted guide-block.

4. In a vehicle trailer, in combination with the vehicle frame and the steering wheel platform, the said platform provided with an A-frame extension, a spring seated pivoted guide-block carried by the front end of said extension and a draw-bar having its inner end connected to the front end of the vehicle frame and its front end slidably bearing in said pivoted guide-block.

5. In a vehicle trailer, in combination with the vehicle frame and the steering wheel platform, the said platform provided with an A-frame extension, a spring seated pivoted guide-block carried by the front end of said extension, a spring restrained coupling member carried by the front end of the said platform and a draw-bar having its inner end connected to said coupling member, and its front end slidably bearing in said pivoted guide-block.

CHARLES G. IRWIN.